United States Patent [19]
Landefeld

[11] Patent Number: 5,098,019
[45] Date of Patent: Mar. 24, 1992

[54] TRUCK TANK

[76] Inventor: Garth Landefeld, 14802 Walters Rd., Houston, Tex. 77068

[21] Appl. No.: 525,451

[22] Filed: May 18, 1990

[51] Int. Cl.⁵ .......................... B05B 15/00; B60P 1/64
[52] U.S. Cl. .................................... 239/172; 239/289; 414/498
[58] Field of Search ............... 239/663, 657, 289, 172; 298/1 A; 414/498

[56] References Cited

U.S. PATENT DOCUMENTS

| | | | |
|---|---|---|---|
| 1,178,299 | 4/1916 | Cornelius | 239/663 |
| 3,145,008 | 8/1964 | Herpich et al. | 414/498 |
| 3,623,621 | 11/1971 | Tarrant, Sr. | 414/498 |
| 3,770,060 | 11/1973 | Forsyth et al. | 239/172 |
| 3,883,020 | 5/1975 | Dehn | 414/498 |

Primary Examiner—Andres Kashnikow
Assistant Examiner—Karen B. Merritt
Attorney, Agent, or Firm—Neal J. Mosely

[57] ABSTRACT

A tank is disclosed for installation on dump trucks. The tank is supported on two pairs of legs which are hinged to the bottom of the tank and pivotally movable between a lowered and locked position for supporting the tank on the ground and a raised position when the tank is installed on a dump truck. The tank has rollers on the bottom and sides to guide the movement of the tank into the truck bed during installation. A distribution manifold for liquid in the tank is secured on the back end of the tank at a level for draining and sprinkling the contents of the tank along with an optional pumping device liquid while standing on the ground on the supporting legs or while on the truck. It is loaded on the truck by tilting the truck bed to the rear and backing the truck to engage the rollers mounted on the front end of the tank. On engagement with the truck bed, the rollers guide the movement of the tank into the bed and the front pair of legs are collapsed and folded under the tank while backing the truck up. When the tank is fully inside the truck bed with the liquid distribution manifold hanging below the level of the truck bed, the spring loaded rear pair of supporting legs are unpinned, rotated 180 to an upper position above the rear end of the tank and secured in place by pinning.

2 Claims, 2 Drawing Sheets

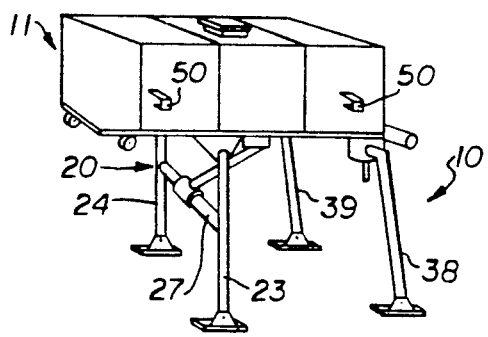
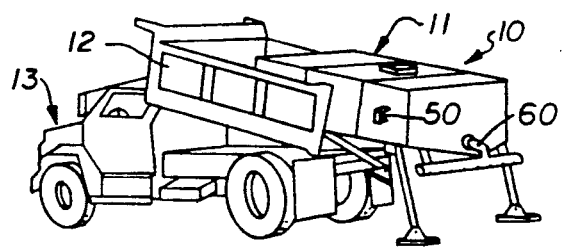
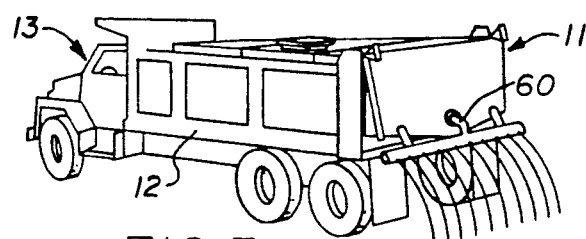
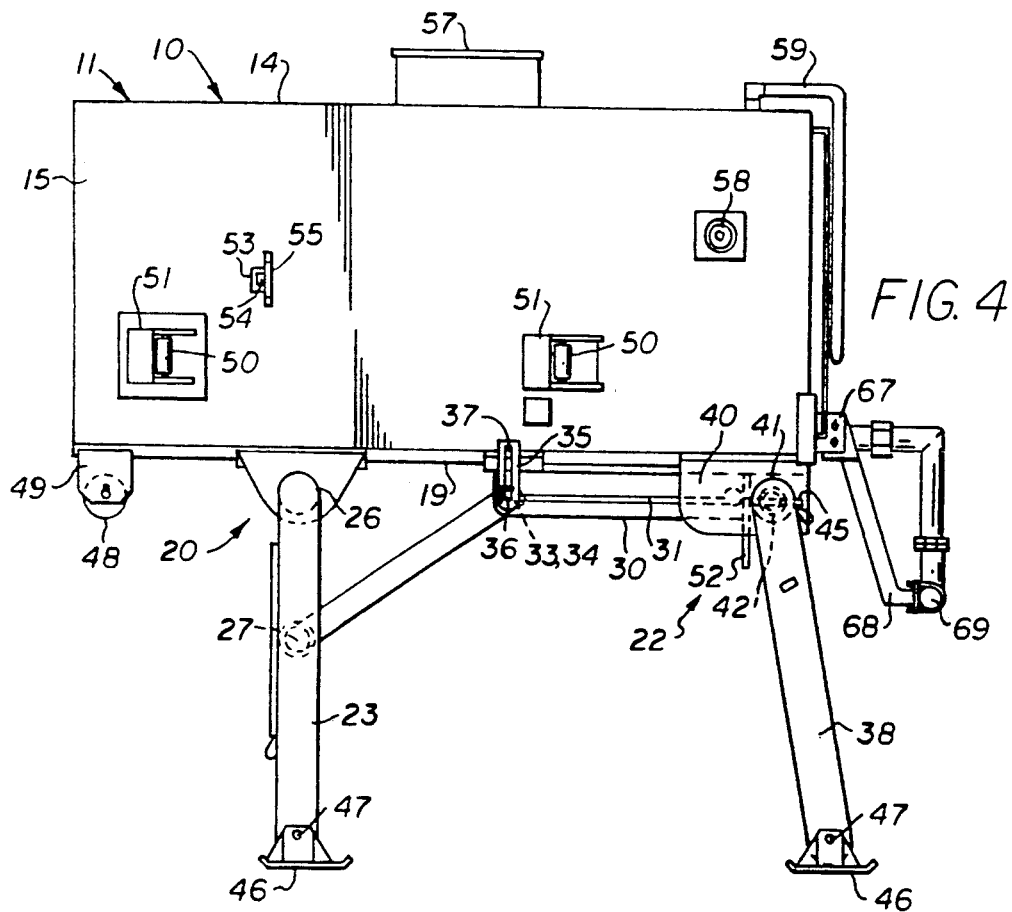

TRUCK TANK

BACKGROUND OF THE INVENTION

1. Field of the Invention

This invention relates generally to tanks for liquid distribution and more particularly to tanks which have a supporting framework for resting on the ground and are easily installed in dump trucks for use in sprinkling liquids.

2. Brief Description of the Prior Art

Mead U.S. Pat. No. 4,351,535 discloses an agricultural tractor with side mounted spray tanks.

Simpson U.S. Pat. No. 4,673,130 discloses a spray boom and carrying system used with a truck carried spray tank.

Christian U.S. Pat. No. 4,186,885 discloses a truck mounted spray device for roadside spraying.

Forsyth et al. U.S. Pat. No. 3,770,060 discloses a modular firefighting unit carried by a truck.

The present invention is distinguished over the prior art in general, and these patents in particular by providing a novel tank assembly for installation on dump trucks. The tank is supported on two pairs of legs which are hinged to the bottom of the tank and pivotally movable between a lowered and locked position for supporting the tank on the ground and a raised position when the tank is installed on a dump truck. The tank has rollers on the bottom and sides to guide the movement of the tank into the truck bed during installation. A distribution manifold for liquid in the tank is secured on the back end of the tank at a level for draining and sprinkling the contents of the tank along with an optional pumping device for loading or unloading contents. The tank is filled with liquid while standing on the ground on the supporting legs or installed on the truck. It is loaded on the truck by tilting the truck bed to the rear and backing the truck to engage the front bottom rollers of the tank. On engagement with the truck bed, the rollers guide the movement of the tank into the bed and the front pair of legs are collapsed and folded under the tank. When the tank is fully inside the truck bed with the liquid distribution manifold hanging below the level of the truck bed, the rear pair of supporting legs are unpinned, rotated 180° to an upper position above the rear end of the tank and secured in place by pinning.

SUMMARY OF THE INVENTION

It is therefore one object of the present invention to provide a new and improved, readily-removable liquid containing tank for distribution of liquids from trucks.

It is another object of this invention to provide a new and improved, readily-removable liquid containing tank for distribution of liquids from trucks particularly adapted for installation on and removal from dump trucks.

Another object of this invention is to provide a new and improved, readily-removable liquid containing tank for distribution of liquids from trucks which has a supporting frame or stand for support on the ground and is particularly adapted for installation on and removal from dump trucks.

Another object of this invention is to provide a new and improved, readily-removable liquid containing tank for distribution of liquids from trucks which has a supporting frame or stand for support on the ground and which is folded up when the tank is installed on a truck.

Still another object of this invention is to provide a new and improved, readily-removable liquid containing tank for distribution of liquids from trucks which has a supporting frame or stand for support on the ground and foldable when the tank is installed on a truck and including a system of rollers for guiding into position on a truck.

Still another object of this invention is to provide a new and improved, readily-removable liquid containing tank for distribution of liquids from trucks which has a supporting frame or stand for support on the ground and is particularly adapted for installation on and removal from a dump truck and foldable when the tank is installed on a dump truck and including a system of rollers for guiding into position on a truck.

A further object of this invention is to provide an improved, readily-removable liquid containing tank for spraying or sprinkling liquids from trucks which has a supporting frame or stand for support on the ground and is particularly adapted for installation on and removal from a dump truck and foldable when the tank is installed on a dump truck and including a system of rollers for guiding into position on a truck.

A further object of this invention is to provide an improved method for installation and removal of a liquid-containing tank for distribution of liquids from trucks.

A further object of this invention is to provide an improved method for installation and removal of a liquid-containing tank for distribution of liquids from dump trucks.

A further object of this invention is to provide an improved method for installation and removal of a liquid-containing tank having a supporting frame or stand for support on the ground and is particularly adapted for installation on and removal from a dump truck.

Other objects of the invention will become apparent from time to time throughout the specification and claims as hereinafter related.

The above noted objects and other objects of the invention are accomplished by a novel tank for installation on dump trucks. The tank is supported on two pairs of legs which are hinged to the bottom of the tank and pivotally movable between a lowered and locked position for supporting the tank on the ground and a raised position when the tank is installed on a dump truck. The tank has rollers on the bottom and sides to guide the movement of the tank into the truck bed during installation. A distribution manifold for liquid in the tank is secured on the back end of the tank at a level for draining and sprinkling the contents of the tank. A pumping device can also be attached as an option of loading and unloading the contents of the tank. The tank is filled with liquid while standing on the ground on the supporting legs or installed on the truck. It is loaded on the truck by tilting the truck bed to the rear and backing the truck to engage the front end of the tank. On engagement with the truck bed, the rollers guide the movement of the tank into the bed and the front pair of legs are collapsed and folded under the tank. When the tank is fully inside the truck bed with the liquid distribution manifold hanging below the level of the truck bed, the rear pair of spring loaded supporting legs are unpinned, rotated to an upper position above the rear end of the tank and secured in place by pinning.

BRIEF DESCRIPTION OF THE DRAWINGS

FIG. 1 is an isometric view of a liquid-containing tank for installation on dump trucks illustrating a preferred embodiment of this invention.

FIG. 2 is an isometric view of a liquid-containing tank, as shown in FIG. 1, being installed on a dump truck illustrating a preferred embodiment of this invention.

FIG. 3 is an isometric view of a liquid-containing tank, as shown in FIG. 1, installed on a dump truck and dispensing liquid therefrom.

FIG. 4 is a view in side elevation of the tank shown in FIG. 1.

DESCRIPTION OF THE PREFERRED EMBODIMENT

Figure 5:
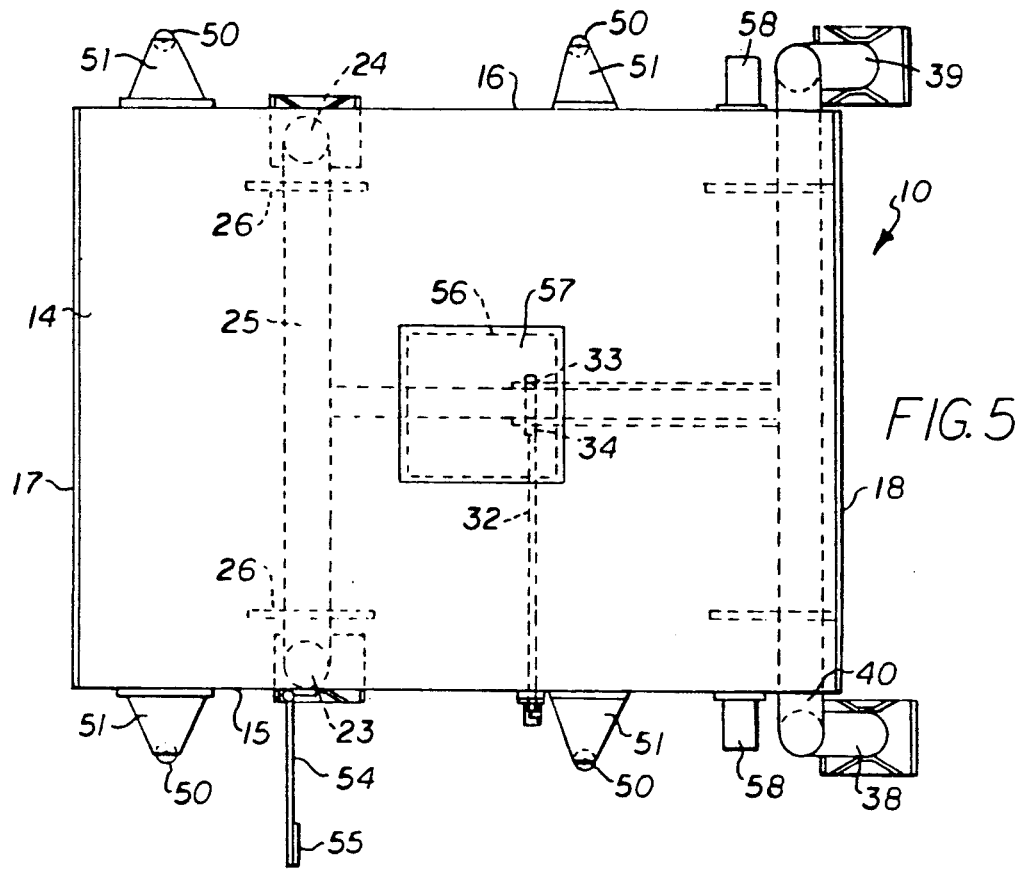
FIG. 5 is a top plan view of the tank shown in FIG. 4.
Figure 6:
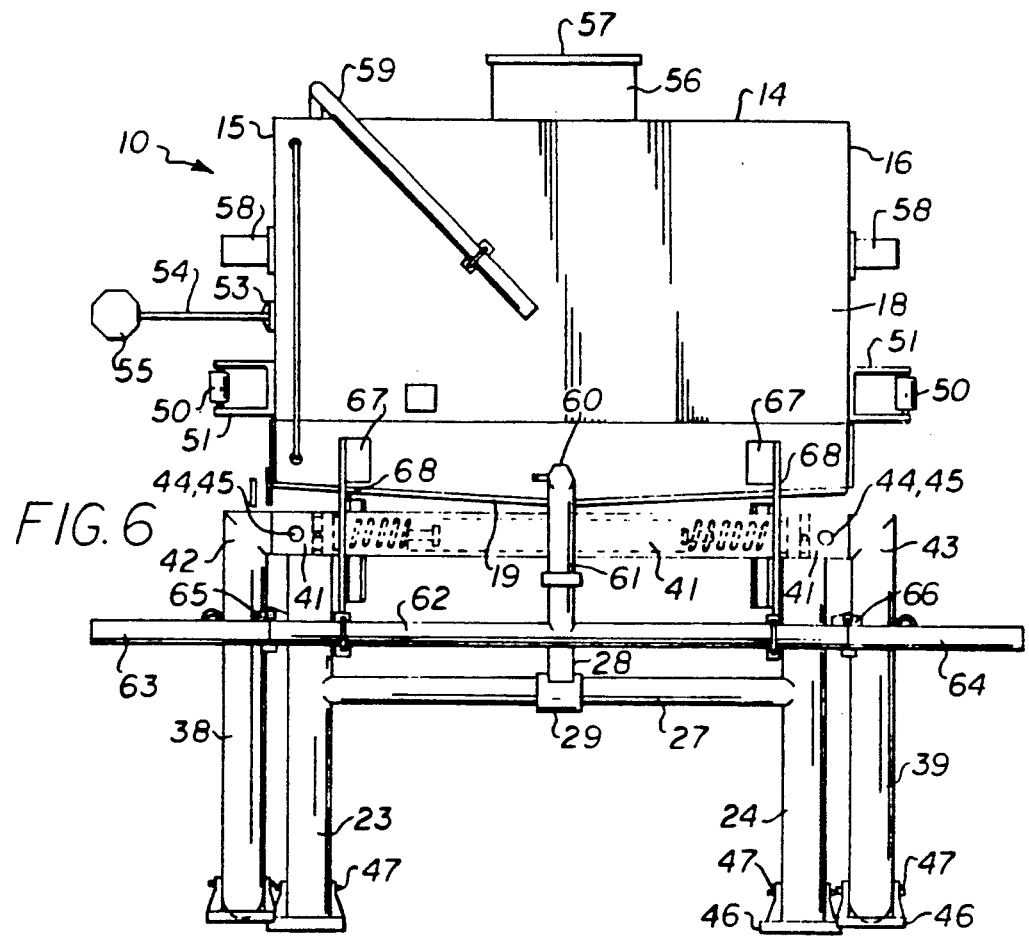
FIG. 6 is a view in right elevation of the tank shown in FIG. 4.

Referring to the drawings by numerals of reference, and more particularly to FIGS. 4-6, there is shown a tank assembly 10 illustrating a preferred embodiment of the invention. Tank assembly 10 comprises a generally rectangular tank 11 sized to fit the bed 12 of a dump truck 13. Obviously, different sized tanks will be required for different sized dump trucks.

Tank 11 is generally rectangular and has a top wall 14, side walls 15 and 16, front wall 17 and rear wall 18 which are substantially planar in shape. Bottom wall 19 of the tank comprises two wall portions meeting at a dihedral angle to provide a shallow trough for directing flow of liquid from the tank to an outlet at the rear of the tank.

Tank 11 is supported, when not installed on truck 13, on a frame assembly 20 comprising two pairs of legs 21 and 22 which are locked in a downwardly extending position and are pivotally rotatable to a retracted position. The forward pair of legs 21 comprises tubular legs 23 and 24 depending at a right angle from tube 25 which forms an axle for rotation of the legs together.

Axle tube 25 extends through and is rotatable supported in a pair of axle supporting journal brackets 26 welded to a support pad welded to the bottom wall 19 of the tank. Legs 23 and 24 are interconnected by tubular brace 27. A locking brace for legs 23 and 24 comprises a square tubular member 28 having a sleeve 29 welded on one end and supported on brace 27 for rotation thereon. A guide channel 30 is welded to the bottom support pad welded to the wall 19 of tank 11 and has a pair of parallel, aligned guide slots 31 therein.

A pin 32 extends through locking brace 28 and has its opposite ends slotted to follow slots 31 to guide movement of the brace along guide channel 30. The ends of pin 32 has a washer 33 and square drive adaptor 34 welded thereon placed outside guide channel 30 to secure the pin in place. A bracket 35 on tank 11 supports a locking rod 36 which is movable by handle portion 37 into and out of square drive adaptor 34 to lock or unlock the locking brace 28.

The rear pair of legs 22 comprises tubular legs 38 and 39. A pair of axle supporting journal brackets 40 are welded to a support pad welded to bottom wall 19 of the tank and have tubular journal member 41 welded therein. Tubular legs 38 and 39 have portions 42 and 43 extending at right angles thereto and extending into the open ends of tubular journal member 41 for pivotal movement therein. Tubular leg portions 42 and 43 and tubular journal member 41 have aligned apertures 44 therein receiving removable pins 45 to secure the legs 38 and 39 against rotation. Pins 45 secure legs 38 and 39 in the downward position, as shown in FIGS. 4-6, and may be removed to allow the legs to be rotated to the upward position, as shown in FIG. 3, and reinserted to lock the legs in that position. Metal shoes 46 are pivotally mounted on axle pins 47 at the bottom ends of legs 38 and 39 (and legs 23 and 24).

Tank 11 has a pair of rollers 48 supported in roller brackets 49 secured on the front end portion of the bottom support pad welded to wall 19 to engage the bed 12 of truck 13 when rolling the tank onto the truck bed. A pair of rollers 50 are supported in roller brackets 51 secured on the front and rear end portions of side walls 15 and 16 to engage the walls of the bed 12 of truck 13 when rolling the tank onto the truck bed. Rollers 48 and 50 therefore guide the movement of tank 11 on and off the truck bed 12. A pair of stop plates 52 welded to the bottom of tank 11 limit movement of the tank on the truck bed 12. A bracket 53 on side wall 15 of tank 11 supports arm 54 with stop sign 55 at its outer end. Arm 54 is spring loaded to an extended position and closes when engaged by the side wall of truck bed 12 upon movement of tank 11 fully onto the truck bed.

Tank 11 has a manhole 56 in top wall 14 closed by cover 57 to permit entry for cleaning or service and filling the tank with liquid. Fill spouts 58 are located on both sides of the tank. An overflow line 59 is located at the top of tank 11 and extends downward along rear wall 18. An outlet valve 60 on the rear wall 18 of tank 11 is connected by line 61 to a water distribution manifold 62, i.e., sprinkler, having extensions 63 and 64 hinged at 65 and 66 for movement between a folded or retracted position and extended position. Brackets 67 support arms 68 which have U-clamps 69 supporting manifold or sprinkler 62. Tank 11 is filled with liquid for sprinkling or distribution and loaded on a truck as described below.

OPERATION

While the operation of this invention should be obvious from the foregoing description, it will be restated for clarity.

The initial, unloaded position of tank assembly 10 is as shown in FIGS. 1 and 4-6 with tank 11 resting on legs 23, 24, 38 and 39. The forward pair of legs 23, 24 are locked in place by the locking pin in locking brace 28. The rear legs 38, 39 are locked in place by locking pin 45. The tank 11 can be loaded in the truck bed 12 either full or empty of water. The tank 11 can be filled through the top opening 56, i.e., manhole, or by the pump at the back of the tank utilizing other sources.

This tank assembly 10 may be used with any dump truck 13, e.g., 5-6 yard dump trucks with the underbody hoist and 10-12 yard dump trucks with the conventional hoists. For a 5-6 yard truck, the empty weight of the tank is about 4,800 lbs. The tank 11 will hold about 1,400 gal. and the total weight loaded is about 16,000 lbs.

The tank 11 is loaded and unloaded onto the bed 12 by using the dump truck 13 as the power source. First, remove the tail gate from the dump truck bed 12. Then, back the truck 13 up to the tank 11. Raise the bed 12 of the dump truck 13 to the tilted position shown and back up truck bed 12. The front legs 23, 24 are coming off the ground as the front end of tank 11 is entering truck bed 12.

The driver continues to back up until the truck bed 12 bumps into the front legs 23, 24. At this point, the driver locks his brakes and goes back to turn the release handle 37 to the unlocked position to allow the legs 23, 24 to fold underneath the tank 11. Handle 37 is stowed after unlocking legs on side 15 of the tank. Then the driver continues to back the truck 13 causing the tank 11 to roll onto the truck bed by means of the rollers 48, 50 until the rear stops 52 are engaged by the truck bed 12. The truck bed 12 is then lowered to a level position with the tank 11 resting in place. Then the driver pulls the pins 45 to unlock the rear legs 38, 39 and rotates the legs 180° to an upright position where the pins 45 are reinserted to lock the legs in the upright position. The legs 38, 39 are spring assisted to ease lifting by the driver. The tank 11 is then secured in place on the truck bed 12 for transportation.

Disbursing water is accomplished in two ways. It may be done by opening valve 60 the allow water to go to the spreader pipe or manifold 62 for sprinkling. It may also be done by operating a pump (not shown) to discharge water from the tank.

Unloading the tank 11 involves the reverse procedures from loading up to the locking of the front legs 23, 24. Legs 38, 39 are unpinned, rotated to the down position and repinned. The driver then pulls the truck forward to move tank 11 out of truck bed 12. As the driver continues to pull ahead, the stop sign 55 folds out and is visible by the driver through the driver's side mirror. At this point, front legs 23, 24 have fallen by gravity to the down position. When this happens, the driver then locks his brakes and steps outside to reinstall the locking handle 37 to lock the front legs 23, 24 in place. He then continues to pull ahead to pull the truck bed 12 free of tank 11.

While this invention has been shown fully and completely with special emphasis on a preferred embodiment, it should be understood that within the scope of the appended claims the invention may be practiced otherwise than as specifically described herein.

I claim:

1. A tank assembly for installation on dump trucks comprising
    a tank for carrying liquids,
    supporting means for supporting said tank at substantially the level of the bed of a dump truck,
    said supporting means being collapsible during installation of said tank on a dump truck bed,
    said tank having an opening for filling with liquid,
    an opening for discharge of liquid,
    a sprinkling manifold connected to said discharge opening and supported on said tank,
    a valve controlling liquid flow through said discharge opening,
    said supporting means comprises two pairs of legs spaced apart at opposite ends of said tank and supported for conjoint pivotal movement,
    one pair of legs at one end of said tank being conjointly pivotally supported on said tank and having a supporting brace connected at one end to said legs,
    a guide channel member receiving the other end of said supporting brace for movement between a collapsed position pivoted under said tank and an opened position supporting said tank,
    another pair of legs at another end of said tank being conjointly pivotally supported on said tank and movable between a down position supporting said tank and a stored position above said tank,
    releasable means locking each of said pairs of legs in a position supporting said tank on the ground,
    the locking means for said one pair of legs comprising a movable pin on release permitting the legs to fold pivotally under said tank,
    the locking means for said another pair of legs comprising a movable pin on release permitting the legs to be moved pivotally to said stored position above said tank, and
    rollers supported in brackets on the bottom and sides of said tank for engagement with the bottom and side walls of said dump truck bed guide said tank into position thereon.

2. A tank assembly for installation on dump trucks according to claim 1 including
    a movable stop signal pivotally supported on a side wall of said tank for movement into and out of view by the driver of said dump truck to indicate movement of said tank a predetermined distance onto said dump truck bed.

* * * * *